US009776493B2

(12) United States Patent
Ono et al.

(10) Patent No.: US 9,776,493 B2
(45) Date of Patent: Oct. 3, 2017

(54) BATTERY HOLDING STRUCTURE FOR VEHICLE

(71) Applicant: HONDA MOTOR CO., LTD., Tokyo (JP)

(72) Inventors: Kazuhiko Ono, Wako (JP); Toru Hasegawa, Wako (JP); Naoyuki Yamate, Wako (JP); Kazuyuki Ochiai, Wako (JP); Yoji Kanaoka, Wako (JP); Hirotaka Sato, Wako (JP); Teppei Oshima, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 102 days.

(21) Appl. No.: 14/806,771

(22) Filed: Jul. 23, 2015

(65) Prior Publication Data

US 2016/0031307 A1    Feb. 4, 2016

(30) Foreign Application Priority Data

Jul. 30, 2014    (JP) .................................. 2014-155307

(51) Int. Cl.
*B60K 1/04* (2006.01)
*B60R 16/04* (2006.01)
*H01M 2/10* (2006.01)
*B60L 11/18* (2006.01)

(52) U.S. Cl.
CPC ............ *B60K 1/04* (2013.01); *B60L 11/1879* (2013.01); *B60R 16/04* (2013.01); *H01M 2/1077* (2013.01); *H01M 2/1083* (2013.01); *B60K 2001/0461* (2013.01); *H01M 2220/20* (2013.01)

(58) Field of Classification Search
CPC ................. B62K 2208/00; B60K 1/04; B60K 2001/0461; B60K 2001/0494; B60L 11/1879; B60R 16/04; H01M 2/1077; H01M 2/1083
See application file for complete search history.

(56) References Cited

U.S. PATENT DOCUMENTS 5,477,936 A * 12/1995 Sugioka .................. B60R 16/04
180/68.5
6,010,804 A *  1/2000 Barksdale ............... B60R 16/04
429/100

(Continued)

FOREIGN PATENT DOCUMENTS

| JP | 2007-76556    | * | 3/2007 |
| JP | 2008-21445    | * | 1/2008 |
| JP | 2012-201318 A |   | 10/2012 |

*Primary Examiner* — Erez Gurari
(74) *Attorney, Agent, or Firm* — Squire Patton Boggs (US) LLP

(57) ABSTRACT

A battery holding structure includes a battery tray for storing a battery therein. A battery holding rack is configured to store the battery tray with the battery stored therein and to allow the battery tray to be pulled out along widthwise directions of the vehicle. A ground wire has one end connected to a negative terminal of the battery and another end connected to a grounding member on a vehicle frame. A movement prevention member fixes the other end of the ground wire to the battery tray and prevents the battery tray from being pulled out to one side along the widthwise directions of the vehicle with the ground wire which is connected to the grounding member.

14 Claims, 12 Drawing Sheets

(56) References Cited

U.S. PATENT DOCUMENTS

| | | | | |
|---|---|---|---|---|
| 7,836,989 B2* | 11/2010 | Reed | ............... | B60R 16/04 |
| | | | | 180/68.5 |
| 7,836,990 B2* | 11/2010 | Reed | ............... | B60R 16/04 |
| | | | | 180/68.5 |
| 8,517,131 B2* | 8/2013 | Kovach | ............... | H01M 2/1083 |
| | | | | 180/68.5 |
| 8,540,046 B2* | 9/2013 | Ishikawa | ............... | B62K 11/04 |
| | | | | 180/220 |
| 8,739,908 B2* | 6/2014 | Taniguchi | ............... | B60L 11/18 |
| | | | | 180/220 |
| 8,794,366 B2* | 8/2014 | Taguchi | ............... | B60R 16/04 |
| | | | | 180/68.5 |
| 8,887,854 B2* | 11/2014 | Ishikawa | ............... | B62K 11/04 |
| | | | | 180/220 |
| 2013/0299265 A1* | 11/2013 | Marazzi | ............... | B60K 1/04 |
| | | | | 180/220 |
| 2015/0329175 A1* | 11/2015 | Inoue | ............... | B60K 1/04 |
| | | | | 307/10.1 |

* cited by examiner

BATTERY HOLDING STRUCTURE FOR VEHICLE

BACKGROUND

Field

The present invention relates to a battery holding structure for a vehicle.

Description of the Related Art

Heretofore, there have been disclosed structures which allow the battery on a motorcycle to be installed and removed along the widthwise directions of the motorcycle (see, for example, Japanese Patent Laid-Open No. 2012-201318, hereinafter Patent Document 1). The battery is prevented from moving along the widthwise directions of the motorcycle by a battery band. The battery has both positive and negative terminals disposed outside along the widthwise directions of the motorcycle.

With the above structure, when the battery is to be removed, it is necessary to carry out work to dislodge the battery band separately from work to detach battery wire terminals from both terminals of the battery.

SUMMARY

It is therefore an object of embodiments of the present invention to facilitate the installation and removal of a battery while preventing the battery from moving in a battery holding structure for a vehicle.

In certain embodiments, a battery holding structure for a vehicle includes a battery tray configured to store a battery therein. A battery holding rack is fixed to a vehicle frame, and can be configured to store the battery tray with the battery stored therein and to allow the battery tray to be pulled out along widthwise directions of the vehicle. A ground wire has one end connected to a negative terminal of the battery and another end connected to a grounding member on the vehicle frame. A movement prevention member is configured to fix the other end of the ground wire to the battery tray and to prevent the battery tray from being pulled out to one side along the widthwise directions of the vehicle with the ground wire which is connected to the grounding member.

According to another embodiment, the battery holding structure further includes a connection and disconnection prevention member which prevents a positive wire from being connected to and disconnected from a positive terminal of the battery when the battery tray with the battery stored therein is in a storage position within the battery holding rack, and which allows the positive wire to be connected to and disconnected from the positive terminal when the battery tray is in a maintenance position where the battery tray has been pulled out of the storage position by a predetermined distance.

According to another embodiment, the battery holding structure further includes a grounding member fastening member configured to fasten the ground wire and the grounding member to each other, and the grounding member fastening member is fastened to the grounding member by a fastening operation from one side along the widthwise directions of the vehicle.

According to another embodiment, a positive terminal of the battery is disposed on one side of the battery along the widthwise directions of the vehicle. The negative terminal of the battery is disposed on the other side of the battery along the widthwise directions of the vehicle.

According to another embodiment, the battery tray includes a handle on one side thereof along the widthwise directions of the vehicle.

According to another embodiment, the battery holding structure further includes a pullout prevention member configured to prevent the battery tray from being pulled out along the widthwise directions of the vehicle. The pullout prevention member has a first engaging portion disposed on the battery tray and a second engaging portion disposed on the battery holding rack, for engaging the first engaging portion in each of a storage position of the battery tray and a maintenance position of the battery tray.

According to another embodiment, the movement preventing member is disposed more on one side along the widthwise directions of the vehicle than a grounding member fastening member.

According to one embodiment, the battery tray is prevented from being pulled out with the ground wire connected to the grounding member. When the battery is to be maintained, the ground wire may be disconnected from the grounding member to allow the battery tray to be pulled out into the maintenance position. Therefore, the battery is prevented from moving out of the storage position, and no process is required to remove a battery band or the like that holds the battery against movement, separately from the ground wire, with the result that the process of maintaining the battery is facilitated.

According to another embodiment, after the ground wire has been disconnected from the grounding member and the battery tray has been pulled out a predetermined distance, the positive wire can be connected to and disconnected from the positive terminal. Therefore, a worker is guided to perform a proper working procedure.

According to another embodiment, it is possible to pull out the battery tray as well as to attach and detach the grounding member fastening member from one side along the widthwise directions of the vehicle, making the maintenance operation of the battery better.

According to another embodiment, the positive terminal can be exposed to allow the positive wire to be connected and disconnected when the battery tray is pulled out by a small distance. The positive wire can be connected and disconnected while much of the battery tray is being stored and held stably in the battery holding rack. Since the periphery of the positive terminal can easily be exposed out of the battery holding rack, the space in which to perform a process of connecting and disconnecting the positive wire is increased for a better maintenance operation.

According to another embodiment, the operation to pull out the battery tray is made efficient.

According to another embodiment, inasmuch as the battery tray is kept in the storage position and the maintenance position, the operation to maintain the battery tray is made efficient, and the battery tray is prevented from being dislodged unintentionally.

According to another embodiment, the portion of the ground wire that extends from the movement prevention member to the grounding member fastening member is made short compared with the case where the grounding member fastening member is disposed more on one side along the widthwise directions of the vehicle than the movement prevention member, so that the ground wire flexes to a small extent when the battery tray is prevented from being pulled out, making it possible to prevent the battery tray from being pulled out with increased moderation.

DETAILED DESCRIPTION

Embodiments of the present invention will be described below with reference to the drawings. Directions such as forward, rearward, leftward, and rightward directions referred to in the description below shall be identical to those on a vehicle to be described below unless otherwise specifically noted. The drawings referred to in the description below include an arrow FR representing the forward direction of the vehicle, an arrow LH representing the leftward direction of the vehicle, and an arrow UP representing the upward direction of the vehicle, appropriately.

Figure 1:
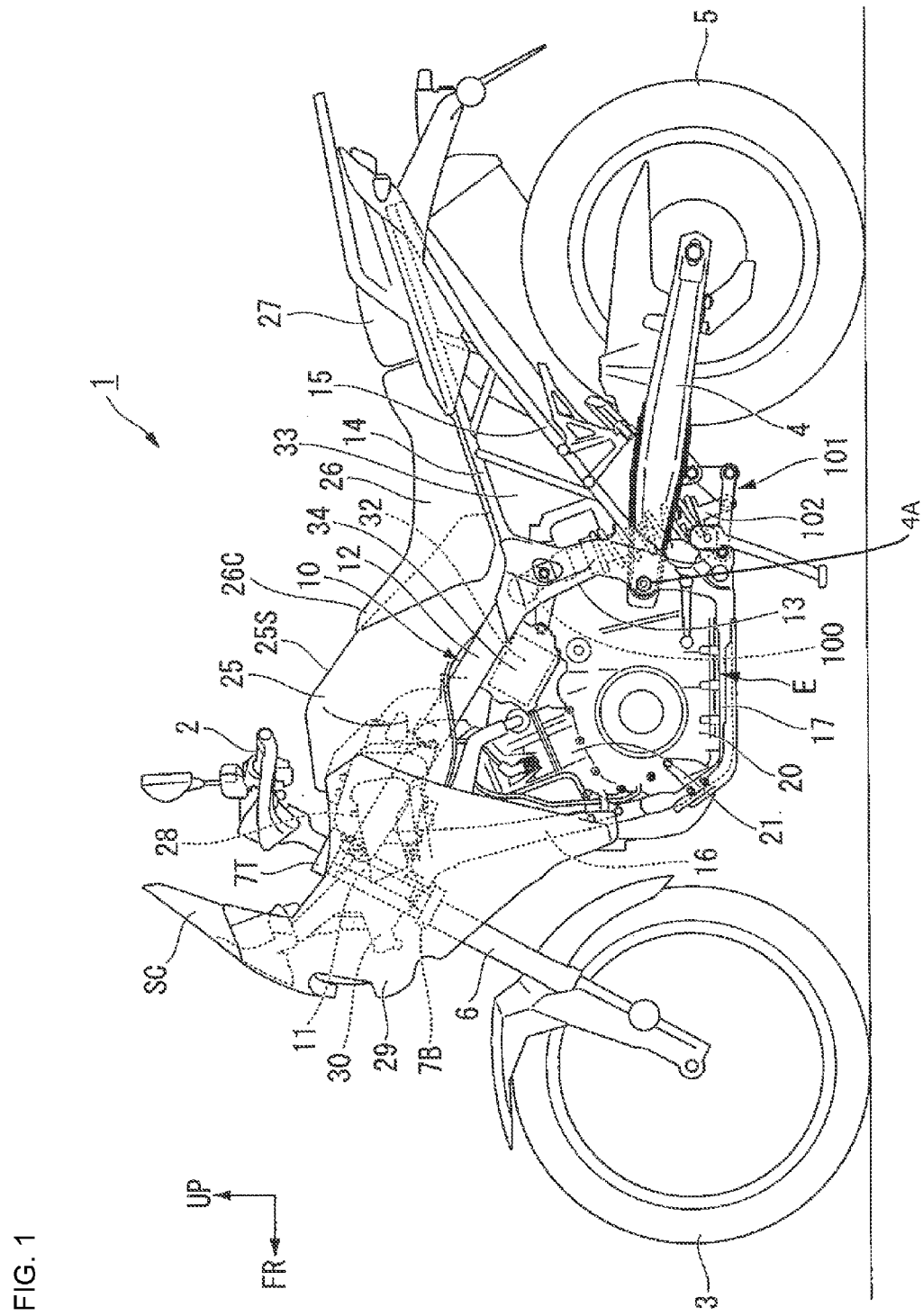
FIG. 1 is a left side elevational view of a motorcycle according to an embodiment of the present invention.

As shown in FIG. 1, a motorcycle 1 according to embodiments of the present invention includes an ending E disposed between a front wheel 3 which can be steered by a steering handle 2 and a rear wheel 5 mounted on the rear end of swing arms 4. Steering-related parts including the steering handle 2 and the front wheel 3 are steerably supported on a head pipe 11 on the front end of a vehicle frame 10. The swing arms 4 have front ends swingably supported on the vehicle frame 10.

The vehicle frame 10 is made up of a plurality of frame members welded integrally together. The vehicle frame 10 includes the head pipe 11, a pair of left and right main frames 12 branched leftwardly and rightwardly from an upper portion of the head pipe 11 and extending rearwardly and downwardly, a pair of left and right pivot plates 13 extending downwardly from the rear ends of the left and right main frames 12, a pair of left and right seat rails 14 extending rearwardly and upwardly from the upper ends of the left and right pivot plates 13, a pair of left and right subframes 15 extending rearwardly and upwardly from lower portions of the left and right pivot plates 13 below the left and right seat rails 14 and joined to the left and right seat rails 14, a single down frame 16 extending downwardly from a lower portion of the head pipe 11, and a pair of left and right lower frames 17 branched leftwardly and rightwardly from the lower end of the down frame 16 and joined to the lower ends of the left and right pivot plates 13.

The vehicle frame 10 is in the form of a semi-double cradle-type vehicle frame wherein the engine E is disposed below the main frames 12 and in front of the pivot plates 13 and has its front and lower portions surrounded by the down frame 16 and the lower frames 17. The engine E is supported on the vehicle frame 10 by a plurality of engine supports disposed at appropriate locations on the vehicle frame 10.

The engine E has a crankcase 20 housing a crankshaft and a transmission as an integral assembly therein, and a cylinder block 21 erected upwardly and forwardly from an upper front surface of the crankcase 20. The crankcase 20 and the cylinder block 21 are disposed in a space surrounded by the main frames 12, the pivot plates 13, the down frame 16, and the lower frames 17. The engine E is a parallel two-cylinder engine, for example, with two cylinders juxtaposed laterally (along the widthwise directions of the motorcycle) in the cylinder block 21.

The steering-related parts supported on the head pipe 11 include the front wheel 3, a pair of left and right front fork members 6 whose lower portions support the front wheel 3, a top bridge 7T and a bottom bridge 7B which extend between upper portions of the left and right front fork members 6, a steering shaft (not shown) extending between the top bridge 7T and the bottom bridge 7B and inserted in the head pipe 11, and the steering handle 2 supported on the top bridge 7T.

The swing arms 4 are supported by a pivot shaft 4A on vertically intermediate portions of the left and right pivot plates 13. A cross frame 100 is disposed between upper portions of the left and right pivot plates 13. A cross member (not shown) is disposed between front portions of the swing arms 4, and a link mechanism 101 is disposed between the cross member and lower portions of the pivot plates 13. A rear cushion 102 is disposed between the link mechanism 101 and the cross frame 100.

A fuel tank 25 that is supported on the main frames 12 is disposed above the engine E. A driver's seat 26 that is supported on front portions of the seat rails 14 is disposed behind the fuel tank 25. A passenger's seat 27 that is supported on rear portion of the seat rails 14 is disposed behind the driver's seat 26. An article storage box 33 that is supported on the seat rails 14 is disposed beneath the driver's seat 26.

The fuel tank 25 extends rearwardly and downwardly from a position behind the head pipe 11 and below the steering handle 2, above and along the main frames 12 to a position above the pivot plates 13. The fuel tank 25 has an upper surface 25S inclined so as to extend downwardly in a rearward direction. The upper surface 25S extends generally parallel to the main frames 12.

The upper surface 25S of the fuel tank 25 is covered from above with a cover 26C extending from a front portion of the driver's seat 26 along the upper surface 25S of the fuel tank 25. The cover 26C extends forwardly and upwardly from a seating region of the driver's seat 26.

An air cleaner 28 is disposed between the head pipe 11 and the fuel tank 25 and above the cylinder block 21 of the engine E. The fuel tank 25 has a rearwardly depressed recess (not shown) defined in a front portion thereof, and the air cleaner 28 has at least a portion disposed in the recess.

A front cowl 29 is disposed around the head pipe 11 in covering relation to a range from a region in front of the head pipe 11 to left and right regions. The front cowl 29 covers left and right front side portions of the fuel tank 25 and also covers left and right side walls of the air cleaner 28.

The front cowl 29 is supported by a front cowl stay 30 disposed in front of the head pipe 11 and within the front cowl 29. A screen SC that smoothly blends into an upper portion of the front cowl 29 is disposed on an upper end of the front cowl 29.

Figure 2:
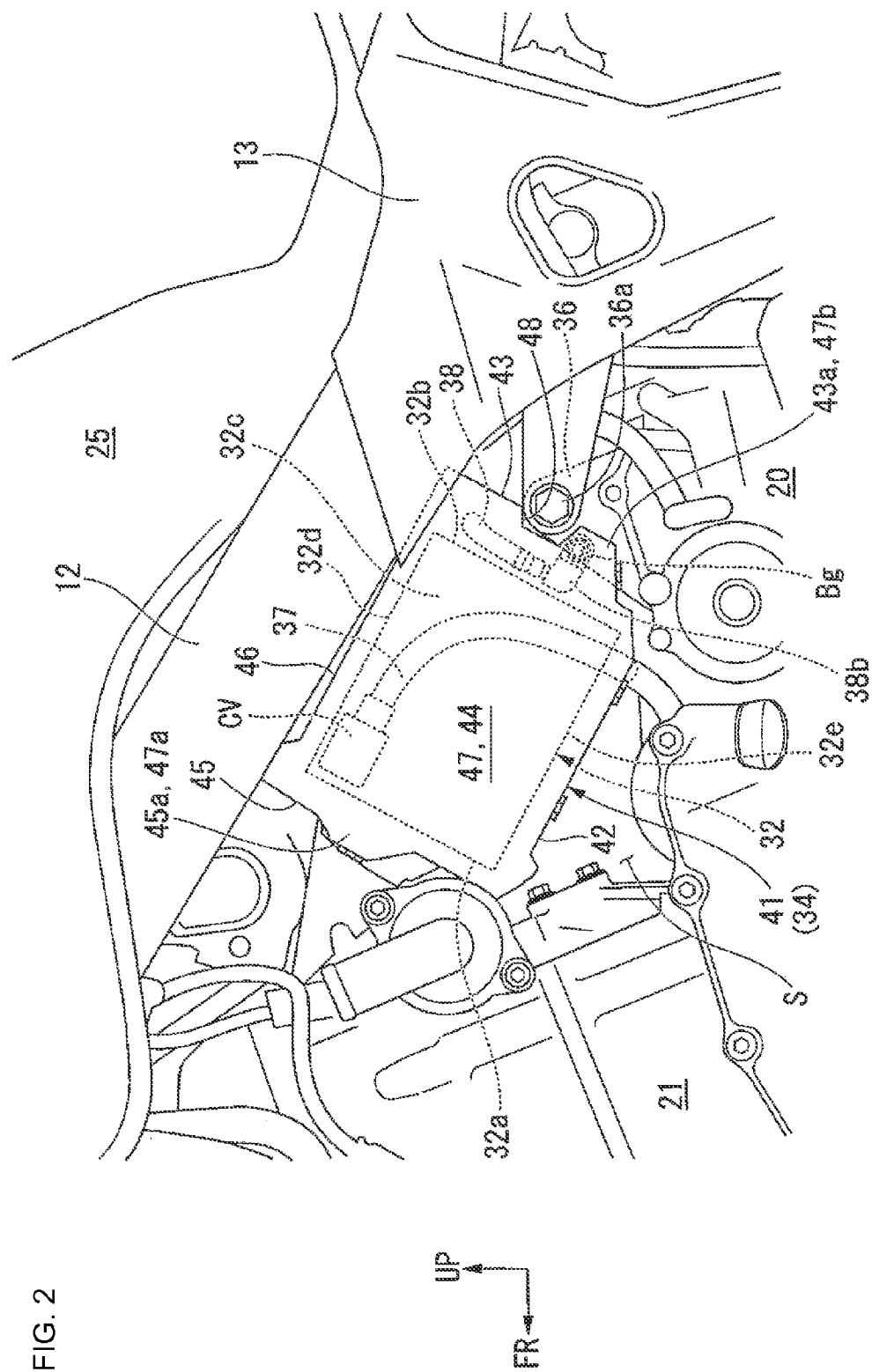
FIG. 2 is a left side elevational view of a portion of the motorcycle.
Figure 3:
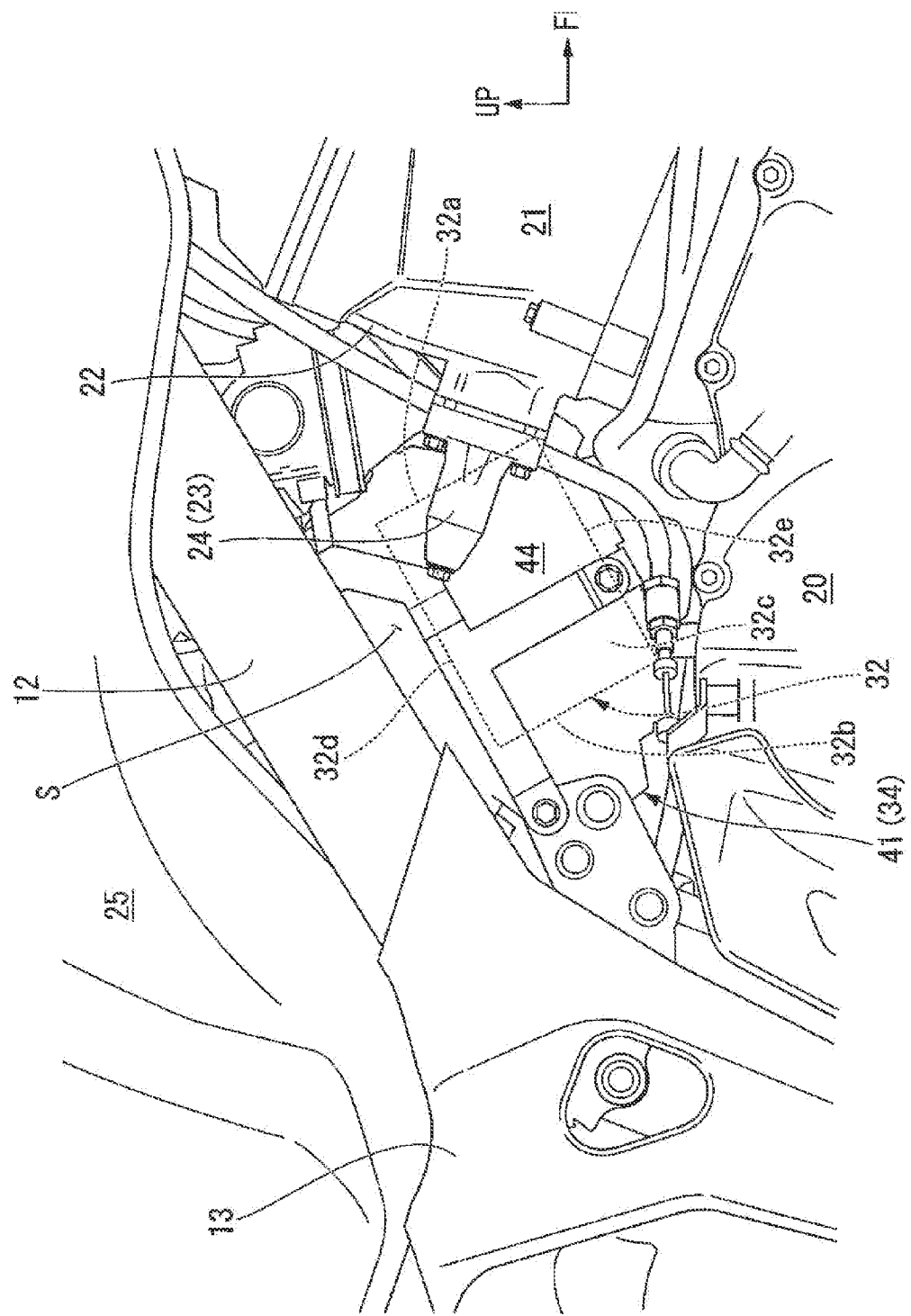
FIG. 3 is a right side elevational view of a portion of the motorcycle.

As shown in FIGS. 2 and 3, a battery 32 is disposed in a space S defined behind the cylinder block 21 of the engine E and above the crankcase 20 and surrounded, as viewed in side elevation, by the cylinder 21, the main frames 12, the pivot plates 13, and the crankcase 20.

Figure 6:
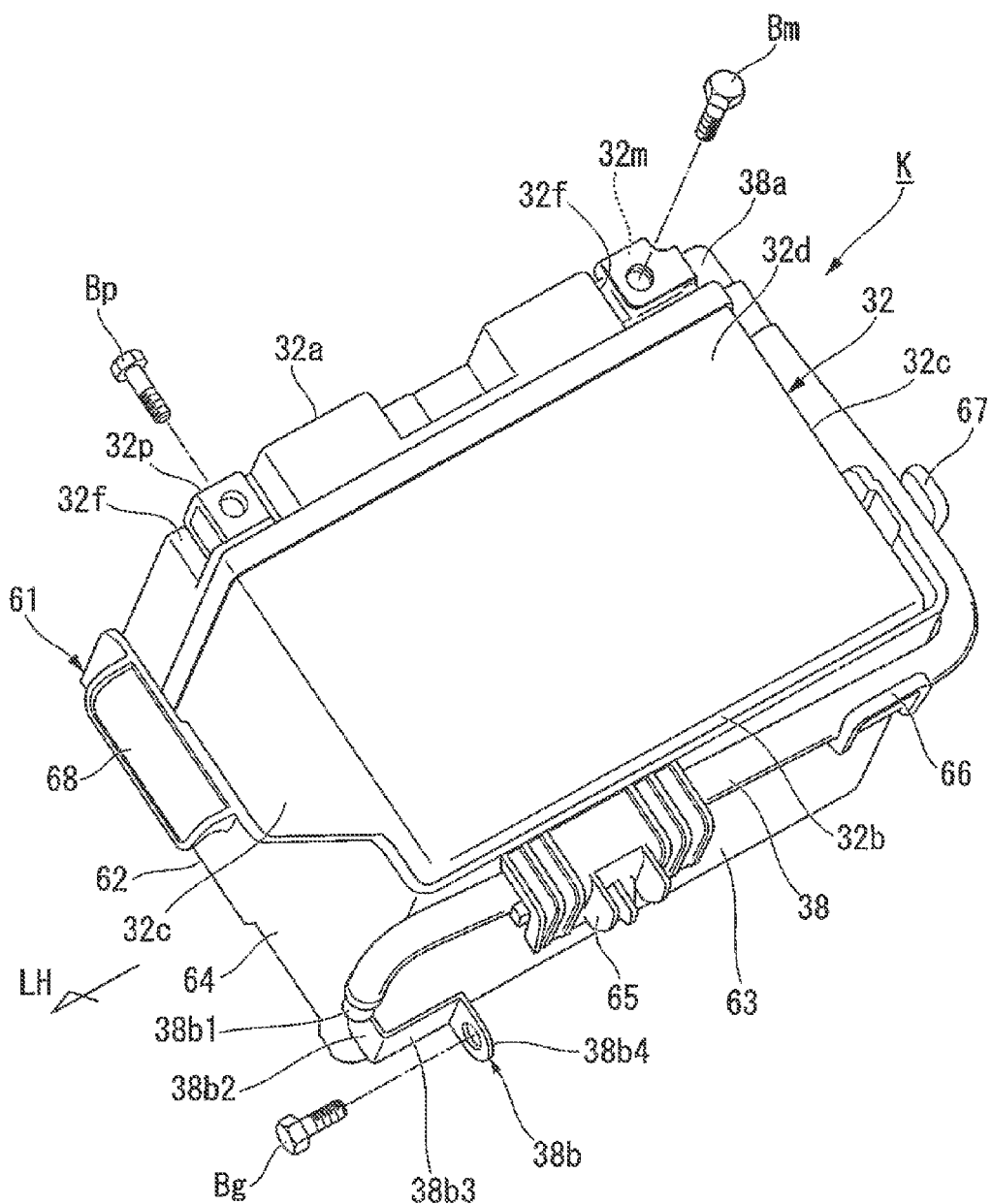
FIG. 6 is a perspective view, as seen from the upper left, of a subassembly of the battery, a battery tray, and a ground wire.

As also shown in FIG. 6, the battery 32 is in the shape of a rectangular parallelepiped, and has a top surface 32a and a bottom surface 32b that are largely inclined forwardly. The battery 32 is disposed such that the top surface 32a and the bottom surface 32b, which are rectangular in shape, have longer sides extending along the widthwise directions of the motorcycle, and shorter sides of the top surface 32a and the bottom surface 32b between which there extend left and right side surfaces 32c lying perpendicularly to the widthwise directions of the motorcycle. A surface of the battery 32 which extends between the upper rear longer sides of the top surface 32a and the bottom surface 32b will hereinafter be referred to as an upper rear surface 32d, and a surface of the battery 32 which extends between the lower front longer sides of the top surface 32a and the bottom surface 32b will hereinafter be referred to as a lower front surface 32e. The battery 32 is inclined with the upper rear surface 32d extending along the lower edges of rear portions of the main frames 12 as viewed in side elevation.

Figure 13:
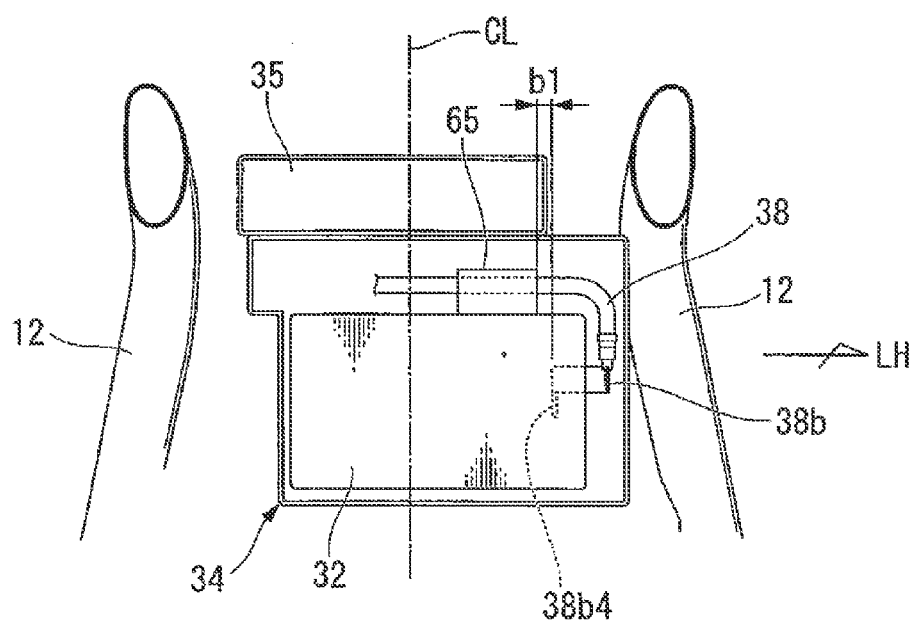
FIG. 13 is a cross-sectional view, parallel to the widthwise directions of the motorcycle, of parts in the periphery of the battery mounted on the motorcycle.

As also shown in FIG. 13, the battery 32 is disposed across a lateral center CL of the motorcycle along the widthwise directions of the motorcycle.

The cylinder block 21 has a cam chain chamber 22 defined in a right portion thereof and a rear protrusion 24 disposed behind the cam chain chamber 22 and housing therein a plunger of a cam chain tensioner 23, etc.

The battery 32 is offset to the left along the widthwise directions of the motorcycle to stay clear of the rear protrusion 24 of the cam chain tensioner 23 on the right portion of the cylinder block 21. An electric component 35 such as an ECU, etc. is disposed above the upper rear surface 32d of the battery 32.

The battery 32 is disposed in overlapping relation to the rear protrusion 24 of the cam chain tensioner 23 as viewed in side elevation. In other words, the rear protrusion 24 of the cam chain tensioner 23 is disposed rightwardly of the right side surface 32c of the battery 32.

As shown in FIG. 2, the fuel tank 25 has its bottom disposed above the upper rear surface 32d of the battery 32, and the crankcase 20 of the engine E has its upper portion disposed below the lower front surface 32e of the battery 32. The cylinder block 21 of the engine E has its rear portion disposed in front of the top surface 32a of the battery 32, and an engine hanger 36, which is of a triangular shape as viewed in side elevation, projecting on the crankcase 20 has its front portion disposed behind the bottom surface 32b of the battery 32.

As shown in FIG. 6, the top surface 32a of the battery 32 is defined by a top having an upper side and left and right sides whose corners have recesses 32f defined in the top surface 32a. A positive terminal 32p is disposed in the left recess 32f, and a negative terminal 32m is disposed in the right recess 32f.

The terminals 32p and 32m, each in the shape of a rectangular parallelepiped, provide a top surface and an upper rear surface parallel to the top surface 32a and the upper rear surface 32d, respectively, of the battery 32. The terminal of a battery wire can be connected to either one of the top surface and the upper rear surface.

Figure 4:
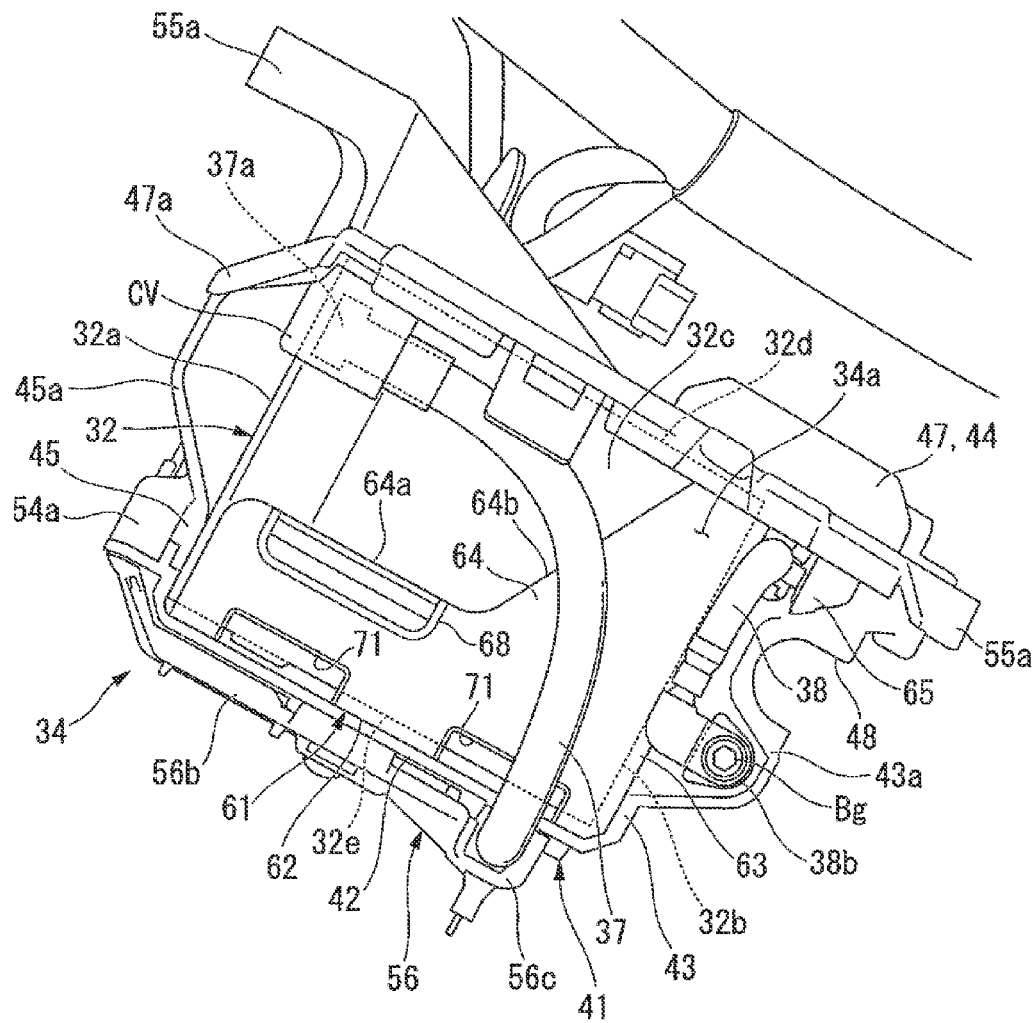
FIG. 4 is a left side elevational view of a battery and a battery case of the motorcycle.

Specifically, as shown in FIGS. 4 and 6, a first terminal 37a on an end of a positive wire 37 is fastened to the top surface of the positive terminal 32p by a fastening bolt Bp inserted from the upper front side and a nut (not shown) disposed in the positive terminal 32p. A first terminal 38a on an end of a ground wire 38 is fastened and fixed to the upper rear surface of the negative terminal 32m by a fastening bolt Bm inserted from the upper rear side and a nut (not shown) disposed in the negative terminal 32m.

A second terminal (not shown) on the other end of the positive wire 37 is connected to electric components of a starter system, an ignition system, and a charging system, etc. A second terminal 38b on the other end of the ground wire 38 is connected as a grounding member to the crankcase 20 of the engine E, for example.

As shown in FIGS. 2 through 5, the battery 32 is mounted on the vehicle frame while being stored in a battery case 34. The battery case 34 includes a box in the shape of a rectangular parallelepiped matching the outer profile of the battery 32. The battery case 34 has a left opening 34a defined in a left end thereof and which can be opened and closed by a lid 47. The battery 32 can be taken into and out of the battery case 34 through the left opening 34a thereof along the widthwise directions of the motorcycle.

The battery case 34 has a battery holding rack 41 fixed to the vehicle frame and a battery tray 61 removably stored in the battery holding rack 41. The battery 32 is stored in the battery tray 61, and can be taken, together with the battery tray 61, into and out of the battery holding rack 41.

Figure 8:
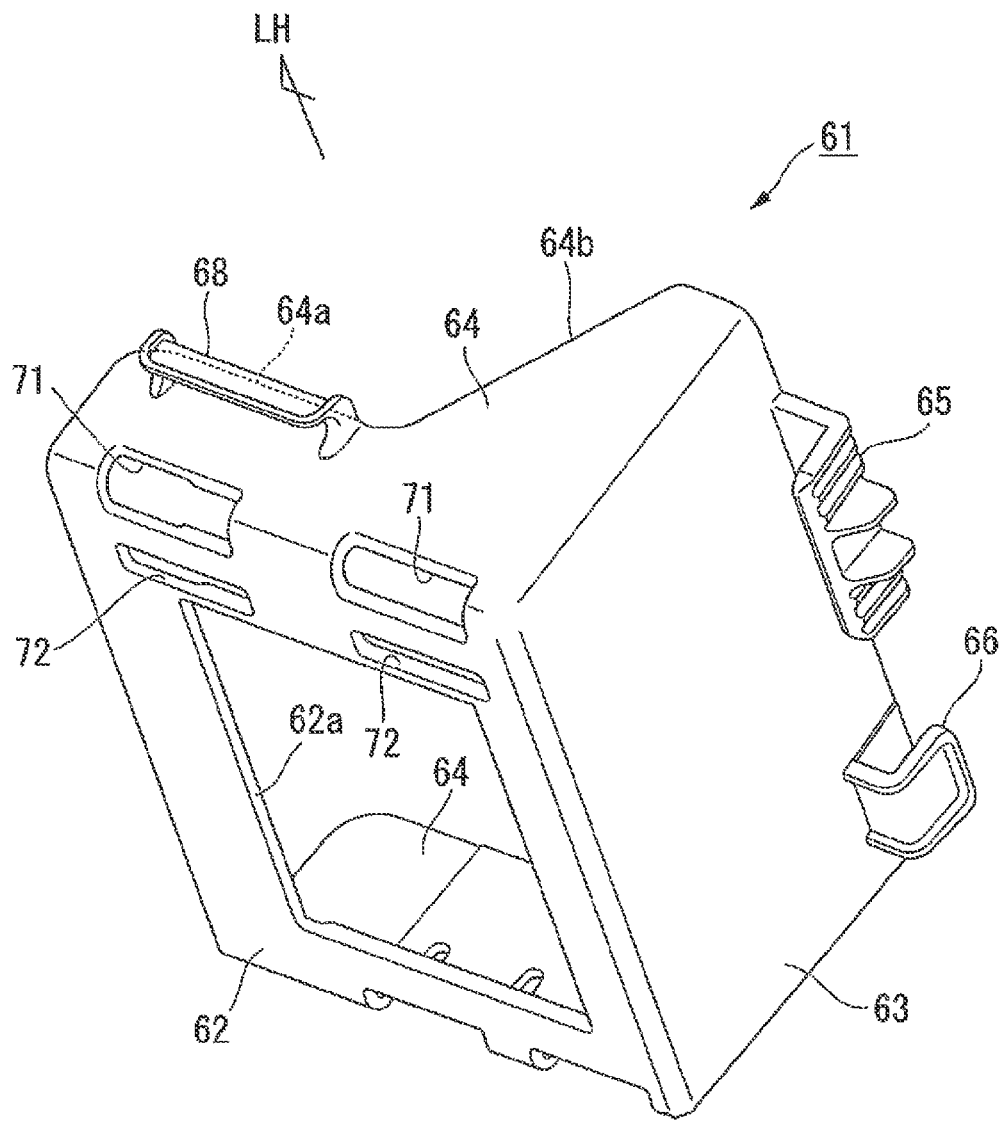
FIG. 8 is a perspective view, as seen from the lower left, of the battery tray.

As also shown in FIGS. 6 and 8, the battery tray 61 has a lower front wall 62 extending along the lower front surface 32e of the battery 32, a bottom wall 63 extending along the bottom surface 32b of the battery 32, and left and right side walls 64 extending along the left and right side surfaces 32c of the battery 32.

The lower front wall 62 is shaped as a frame with an opening 62a defined therein.

The bottom wall 63 has a downwardly open hook-shaped wire clamp 65 disposed on an upper left edge thereof and an upwardly open hook-shaped rear wire guide 66 disposed on an upper right portion thereof. The wire clamp 65 is wider than the rear wire guide 66 along the widthwise directions of the motorcycle.

The left and right side walls 64 are of an L shape as viewed in side elevation, including portions along the lower front wall 62 and the bottom wall 63. The portions of the left and right side walls 64 along the lower front wall 62 have an upper edge 64a extending substantially parallel to the lower front wall 62. The portions of the left and right side walls 64 along the bottom wall 63 have a front edge 64b slanted so as to become closer to the bottom wall 63 in an upward direction. The portion of the right side wall 64 along the bottom wall 63 has a right wire guide 67, similar to the rear wire guide 66, on an upper portion thereof.

The left side wall 64 has on an upper edge thereof a downwardly open hook-shaped handle 68 for pulling out the battery tray 61. The corner between the left side wall 64 and the lower front wall 62 has a pair of front and rear first recesses 71 defined therein. The lower front wall 62 has a pair of front and rear second recesses 72 defined in a portion thereof which is positioned more inwardly than the corner along the widthwise directions of the motorcycle, the front and rear second recesses 72 being aligned in position with the front and rear first recesses 71 along longitudinal directions of the motorcycle.

Figure 7:
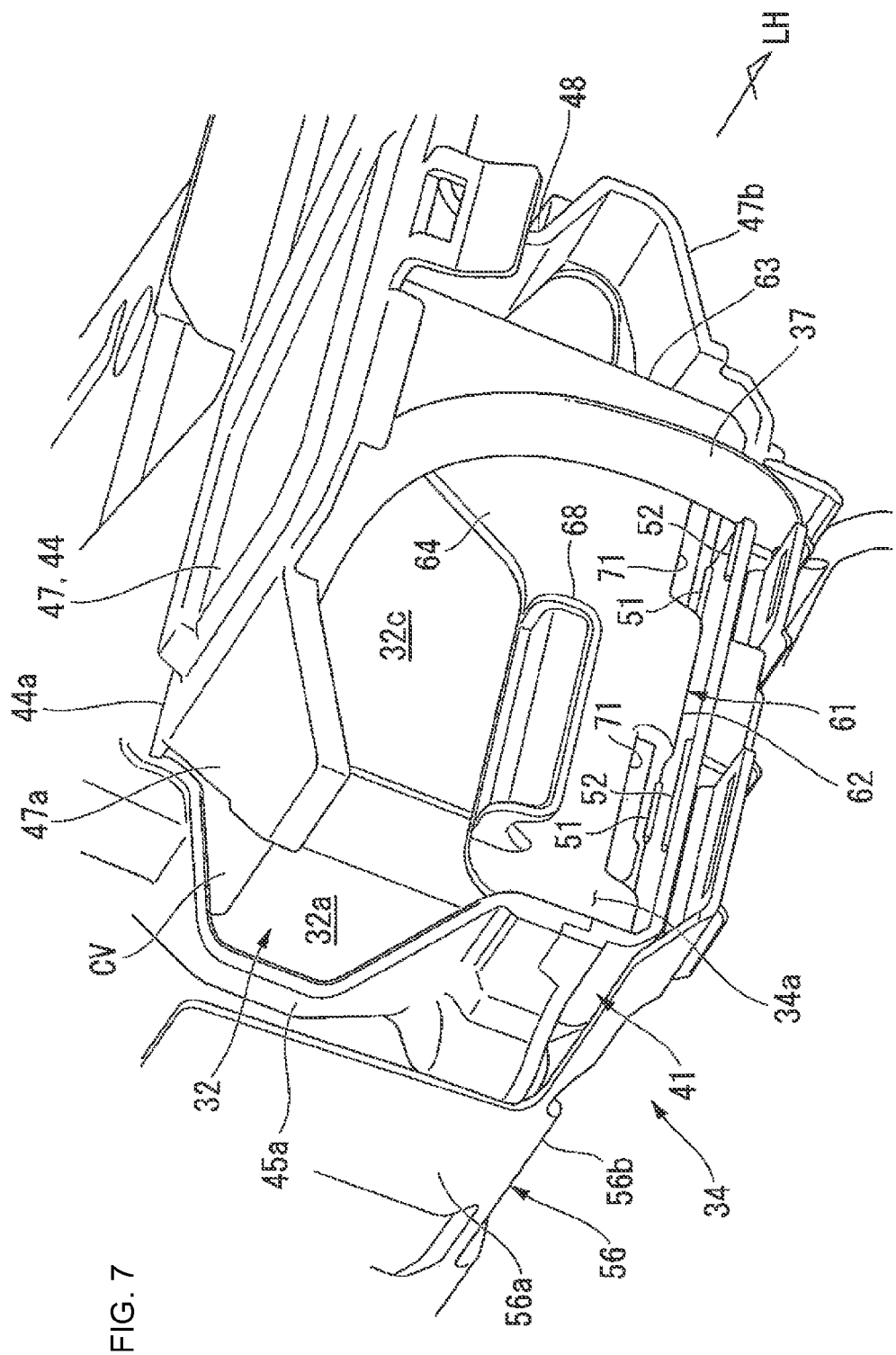
FIG. 7 is a perspective view, as seen from the front left, of peripheral parts around a left opening in the battery case.
Figure 9:
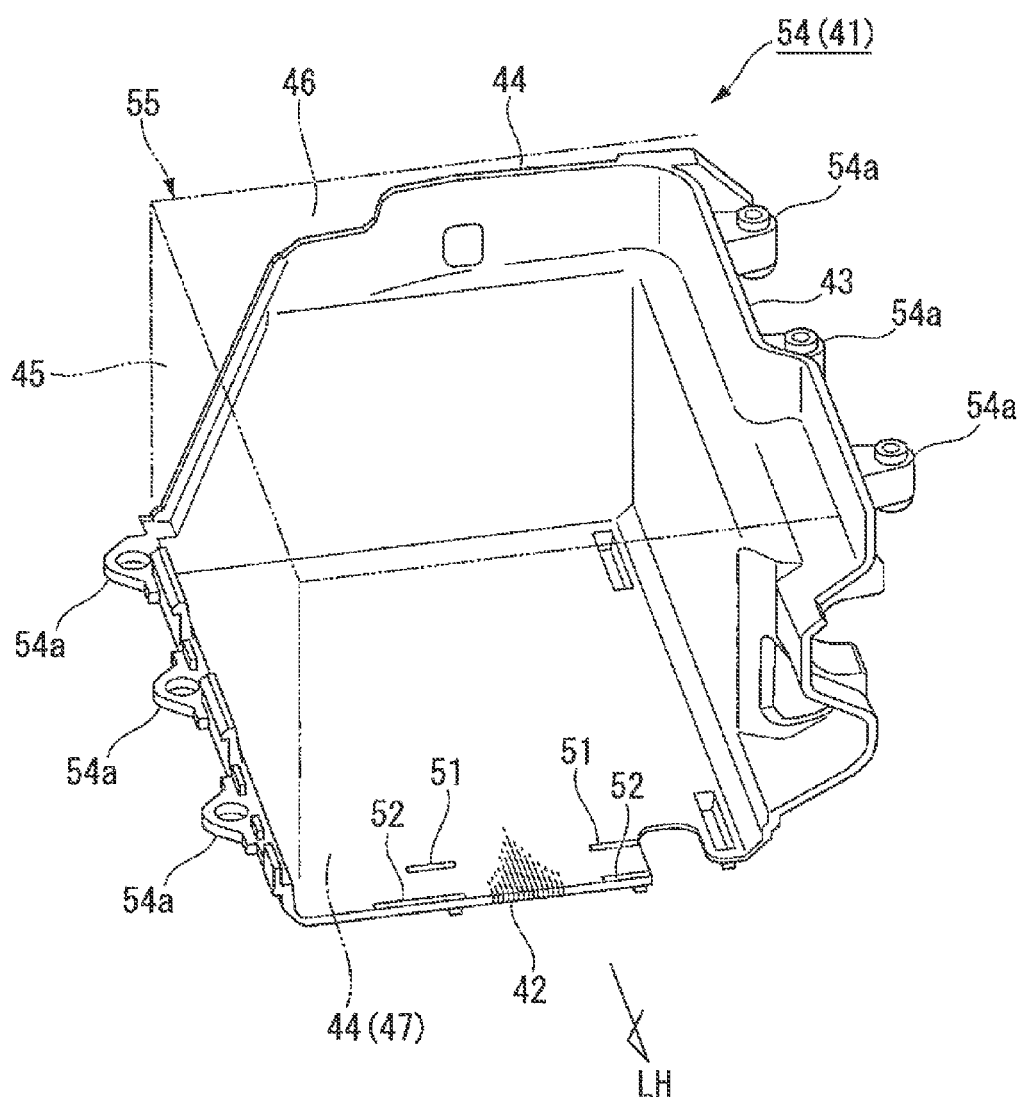
FIG. 9 is a perspective view, as seen from the upper left, of a lower portion of a rack of the battery case.

As shown in FIGS. 7 and 9, the battery holding rack 41 has a pair of front and rear first engaging teeth 51 corresponding to the front and rear first recesses 71, and a pair of front and rear second engaging teeth 52 corresponding to the front and rear second recesses 72. The front and rear first engaging teeth 51 are positioned more inwardly than the left end of the battery holding rack 41 along the widthwise directions of the motorcycle, and the front and rear second engaging teeth 52 are positioned at the left end of the battery holding rack 41.

Figure 10:
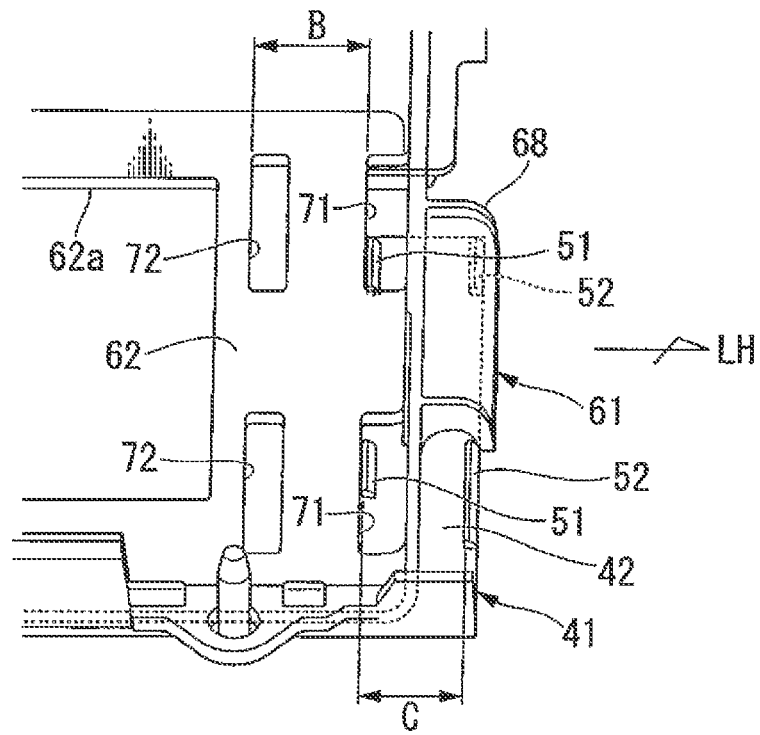
FIG. 10 is a plan view of a pullout prevention member at the time the battery tray is in a storage position.
Figure 11:
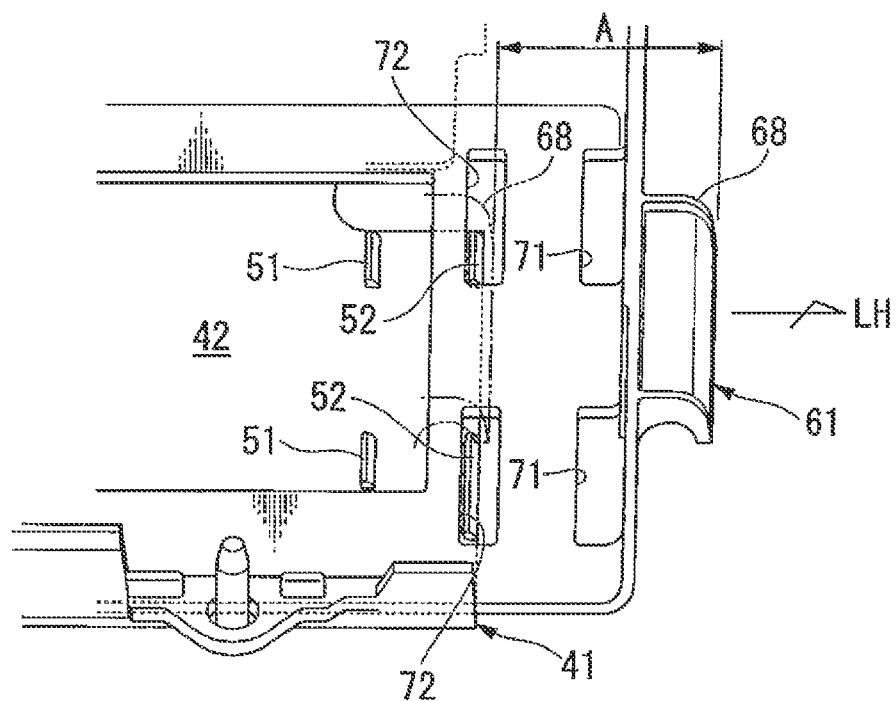
FIG. 11 is a plan view of the pullout prevention member at the time the battery tray is in a maintenance position.

As shown in FIGS. 10 and 11, when the battery tray 61 is inserted through the left opening 34a into the battery holding rack 41, it is in a position referred to as a storage position (see FIG. 10), and when the battery tray 61 is pulled out from the storage position to the left by a distance A, it is in a position referred to as a maintenance position (see FIG. 11). The maintenance position is a position where the periphery of the positive terminal 32p on the left side of the battery 32 is pulled out of the battery holding rack 41 while the battery tray 61 and the battery 32 are being held in the battery holding tray 41, and the positive wire 37 can be connected to and disconnected from the positive terminal 32p.

The distance along the widthwise directions of the motorcycle between the inner edges of the first recesses 71 along the widthwise directions of the motorcycle and the inner edges of the second recesses 72 along the widthwise directions of the motorcycle is referred to as a distance B, whereas the distance along the widthwise directions of the motorcycle between the inner edges of the first engaging teeth 51 along the widthwise directions of the motorcycle and the inner edges of the second engaging teeth 52 along the widthwise directions of the motorcycle is referred to as a distance C. The sum of the distance B and the distance C is equal to the distance A.

Specifically, when the battery tray 61 is in the storage position, the inner edges of the front and rear first engaging teeth 51 of the battery holding rack 41 along the widthwise directions of the motorcycle engage the inner edges of the front and rear first recesses 71 along the widthwise directions of the motorcycle, preventing the battery tray 61 from being pulled out. When the battery tray 61 is in the maintenance position, the inner edges of the front and rear second engaging teeth 52 of the battery holding rack 41 along the widthwise directions of the motorcycle engage the inner edges of the front and rear second recesses 72 along the widthwise directions of the motorcycle, preventing the battery tray 61 from being pulled out. The engaging teeth 51 and 52 engage in the recesses 71 and 72 under the weights of the battery tray 61 and the battery 32. The engaging teeth 51 and 52 disengage from the recesses 71 and 72 when the battery tray 61 and the battery 32 are lifted off a rack lower front wall 42 of the battery holding rack 41.

As shown in FIG. 6, the ground wire 38 extends upwardly and rearwardly from the first terminal 38a that is fixed to the negative terminal 32m on the right side of the battery 32, along the upper edge of the right side surface 32c of the battery 32 and the upper edge of the right side wall 64 of the battery tray 61. Then, the ground wire 38 is bent to the left along the corner between the right side wall 64 and the bottom wall 63 of the battery tray 61, and extends along the upper edge of the bottom wall 63 of the battery tray 61.

The second terminal 38b of the ground wire 38 has a crimped portion 38b1 that is crimped to hold the end of the ground wire 38, a joint 38b2 in the form of a plate extending perpendicularly to the widthwise directions of the motorcycle beneath the crimped portion 38b1, an arm 38b3 bent from the rear end of the joint 38b2 and extending inwardly along the widthwise directions of the motorcycle, and a fastening portion 38b4 erected rearwardly from the distal end of the arm 38b3. A fasting bolt Bg is inserted from outside along the widthwise directions of the motorcycle into the fastening portion 38b4, and is threaded into a threaded hole in a fastening member on a front portion of the engine hanger 36. In this manner, the ground wire 38 connected to the negative terminal 32m of the battery 32 is connected to the crankcase 20 which serves as a grounding member.

The ground wire 38 is held by the right wire guide 67 and the rear wire guide 66 of the battery tray 61 across the bent portion thereof along the corner of the battery tray 61. The ground wire 38 is held by the wire clamp 65 on the left side of the bottom wall 63 of the battery tray 61, and secured to the wire clamp 65 by clamping means such as a band clip or the like. The ground wire 38 is held taut integrally on the battery 61. The battery 32, the battery tray 61, and the ground wire 38 jointly make up a subassembly K that can be taken as a unit into and out of the battery holding rack 41.

As shown in FIGS. 2 through 5 and 7, the battery holding rack 41 has the rack lower front wall 42 and a rack bottom wall 43 which extend respectively along the lower front wall 62 and the bottom wall 63 of the battery tray 61, and rack left and right side walls 44 that extend respectively along the left and right side walls 64 of the battery tray 61. The battery holding rack 41 also has a rack top wall 45 and a rack upper rear wall 46 that extend respectively along the top surface 32a and the upper rear surface 32d of the battery 32 which is stored in the battery tray 61, and is in the form of a box having a rectangular parallelepiped as a whole.

Figure 5:
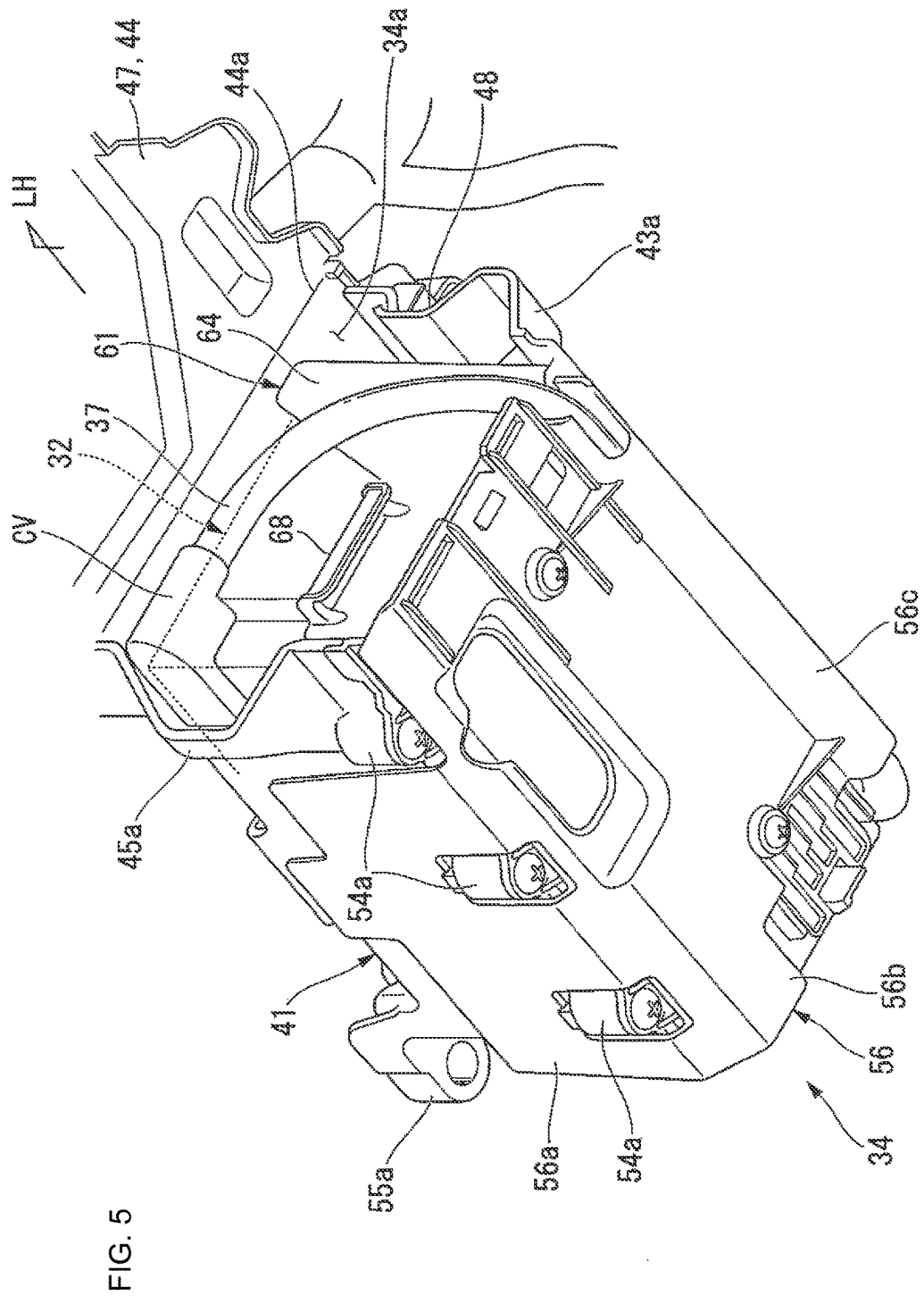
FIG. 5 is a perspective view, as seen from the lower left, of the battery and the battery case.

As shown in FIGS. 5 and 9, the battery holding rack 41 is divided into a rack lower portion 54 that provides the rack lower front wall 42, the rack bottom wall 43, and the rack right side wall 44, a rack upper portion 55 that provides the rack upper rear wall 46, the rack top wall 45, and the rack left side wall 44, and a rack cover 56 that covers the rack top wall 45 and the rack lower front wall 42 from outside the battery holding rack 41.

A front edge of the rack lower front wall 42 of the rack lower portion 54 and an upper edge of the rack bottom wall 43 of the rack lower portion 54, and a lower edge of the rack top wall 45 of the rack upper portion 55 and a rear edge of the rack upper rear wall 46 of the rack upper portion 55 have fastening members 54a for coupling the rack lower portion 54 and the rack upper portion 55 to each other. The rack upper rear wall 46 of the rack upper portion 55 has on its periphery mounts 55a for mounting the battery holding rack 41 on a vehicle component such as the vehicle frame 10 or the like. The battery holding rack 41 and the battery tray 61 and the battery 32 which are stored in the battery holding rack 41 are suspended from and supported on the vehicle frame.

As shown in FIGS. 2, 4, 5, and 7, the rack left side wall 44 has an upper edge coupled by a hinge 44a to a left side edge of the rack upper rear wall 46. The rack left side wall 44 is movable to move its lower edge portion vertically and functions as the lid 47 for opening and closing the left opening 34a of the battery holding rack 41. The lid 47 has on its front portion a projecting member 47*a* having a trapezoidal shape as viewed in side elevation. The projecting member 47*a* is provided in association with a bulging member 45*a* having a trapezoidal shape as viewed in side elevation, on the left side of the rack top wall 45. The bulging member 45*a* and the projecting member 47*a* jointly define a space for allowing the positive wire 37 to be connected to and disconnected from the positive terminal 32*p*.

The lid 47 has on a rear portion thereof a projecting member 47*b* which covers the position where the second terminal 38*b* of the ground wire 38 is fastened from outside along the widthwise directions of the motorcycle. The projecting member 47*b* is provided in association with a bulging member 43*a* on the left side of the rack bottom wall 43. The bulging member 43*a* and the projecting member 47*b* jointly conceal the position where the second terminal 38*b* of the ground wire 38 is fastened. A cavity 48 for accommodating a hanger bolt 36*a* inserted in the engine hanger 36 is defined above the bulging member 43*a* and the projecting member 47*b*.

As shown in FIGS. 4 and 5, the rack cover 56 has a cover top wall 56*a* extending along the rack top wall 45 and a cover lower front wall 56*b* extending along the rack lower front wall 42, and covers a region of the battery holding rack 41 which faces the engine E. The cover lower front wall 56*b* has on a rear portion thereof a tunnel-shaped wire guide 56*c* extending along the widthwise directions of the motorcycle.

Figure 12:
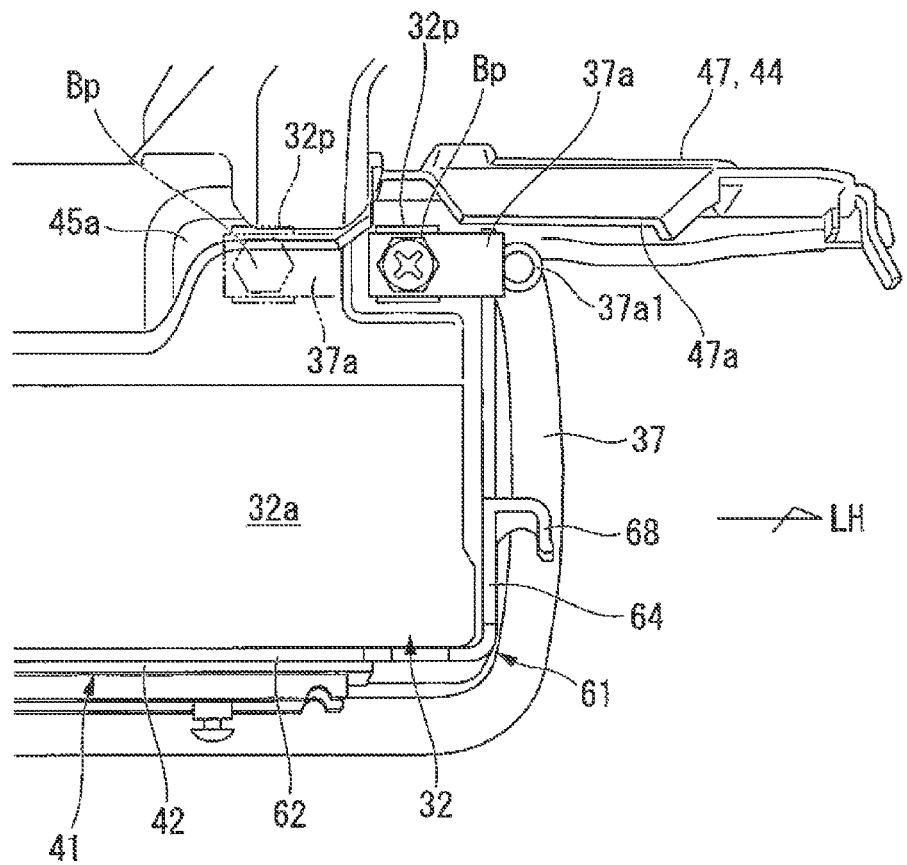
FIG. 12 is a view of peripheral parts around the positive terminal of the battery at the time the battery tray is in the maintenance position, as seen along a direction perpendicular to the top surface of the battery.

The positive wire 37 as it is connected to the battery 32, etc. extends rearwardly along the left side surface 32*c* of the battery 32 behind a crimped portion 37*a*1 (see FIG. 12) of the first terminal 37*a* which is disposed on the left side of the positive terminal 32*p*. Then, the positive wire 37 is bent downwardly and extends downwardly along the left side wall 64 of the battery tray 61. The positive wire 37 is inserted in the tunnel-shaped wire 56*c* of the rack cover 56 below the battery tray 61, and extends to the right along the widthwise directions of the motorcycle through the wire guide 56*c*. Then, the positive wire 37 is connected to an electric component such as a starter magnet or the like.

As shown in FIGS. 9 through 11, the front and rear first engaging teeth 51 for engaging in the front and rear first recesses 71 at the time the battery tray 61 is in the storage position are disposed on the upper surface of a region of the rack lower front wall 42 which is positioned more inwardly along the widthwise directions of the motorcycle than a left side edge thereof. The front and rear second engaging teeth 52 for engaging in the front and rear second recesses 72 at the time the battery tray 61 is in the maintenance position are disposed on the upper surface of the left side edge of the rack lower front wall 42.

Operation of the present embodiment will be described below.

The battery tray 61 with the battery 32 housed therein is inserted into the battery holding rack 41 through the left opening 34*a* thereof along the widthwise directions of the motorcycle. When the battery tray 61 is fully inserted, the left side wall 64 of the battery tray 61 and the left opening 34*a* of the battery holding rack 41 are held in substantially identical positions along the widthwise directions of the motorcycle. At this time, the battery tray 61 is in the storage position in which the front and rear first engaging teeth 51 engage in the front and rear first recesses 71, preventing the battery tray 61 from moving along the widthwise directions of the motorcycle, particularly along a direction to pull out the battery tray 61. The left opening 34*a* of the battery holding rack 41 is closed by the lid 47 (rack left side wall 44), which is appropriately locked in its closed state. Therefore, the lid 47 also prevents the battery tray 61 from moving. The process of storing the battery tray 61 and the battery 32 into the battery holding rack 41 is now completed.

In the storage position of the battery tray 61, the periphery of the positive terminal 32*p* of the battery 32 housed in the battery tray 61 is surrounded by the rack top wall 45 and the rack upper rear wall 46, etc. Consequently, even if the lid 47 is open, the positive wire 37 cannot be connected to and disconnected from the positive terminal 32*p* insofar as the battery tray 61 is in the storage position. Stated otherwise, in the storage position of the battery tray 61, the periphery of the positive terminal 32*p* of the battery 32 is in an inaccessible position surrounded by the walls of the battery holding rack 41 (the positive terminal 32*p*, the first terminal 37*a*, and the fastening bolt Bp at this time are indicated by the dot-and-dash lines in FIG. 12). When the positive terminal 32*p* is in the inaccessible position, even though an insulative cover CV of the positive terminal 32*p* can be removed, a tool such as a wrench or the like cannot be placed on or removed from the fastening bolt Bp and hence it is not possible to connect and disconnect the positive terminal 37.

For pulling the battery tray 61 in the storage position out of the battery holding rack 41, the lid 47 is first opened, and then the second terminal 38*b* of the ground wire 38 is unfastened, breaking the grounding connection. Thereafter, the battery tray 61 is lifted off the rack lower front wall 42, disengaging the front and rear first engaging teeth 51 from the front and rear first recesses 71. Then, the battery tray 61 is pulled out to the left by the distance A. In other words, the battery tray 61 is pulled out into the maintenance position. Thereafter, the battery tray 61 is placed again on the rack lower front wall 42, whereupon the front and rear second engaging teeth 52 engage in the front and rear second recesses 72, preventing the battery tray 61 from moving along the widthwise directions of the motorcycle, particularly along the direction to pull out the battery tray 61.

In the maintenance position of the battery tray 61, while the battery tray 61 and the battery 32 are being held in the battery holding rack 41, the periphery of the positive terminal 32*p* on the left side of the battery 32 stored in the battery tray 61 is exposed out of the battery holding rack 41, allowing the positive wire 37 to be connected to and disconnected from the positive terminal 32*p*. Stated otherwise, in the maintenance position of the battery tray 61, the periphery of the positive wire 37 of the battery 32 is in an accessible position exposed out of the battery holding rack 41.

Even if attempts are made to pull out the battery tray 61 while the second terminal 38*b* is being fixed to the crankcase 20, since the wire clamp 65 of the battery tray 61 is securely holding the ground wire 38, the battery tray 61 can be pulled out only to the extent which the ground wire 38 flexes from the wire clamp 65 to the second terminal 38*b*, and cannot be moved into the maintenance position. Therefore, while the second terminal 38*b* is being fixed to the crankcase 20, the positive terminal 32*p* of the battery 32 cannot be exposed out of the battery holding rack 41, making it impossible to connect and disconnect the positive wire 37.

When the fastening bolt Bg is removed to unfasten the second terminal 38*b* from the crankcase 20 (to break the grounding connection), the second terminal 38*b* no longer prevents the battery tray 61 and the battery 32 from being pulled out, so that the battery tray 61 and the battery 32 can be pulled out of the battery holding rack 41. At this time, the battery tray 61 is pulled out into the position (maintenance position) where the second engaging teeth 52 of the battery holding rack 41 engage in the front and rear second recesses 72 in the battery tray 61, allowing the positive terminal 32*p* to be connected to and disconnected from the battery 32 while the battery 32 and the battery tray 61 are being held in the battery holding rack 41 and prevented from being dislodged unintentionally.

After the first terminal 37*a* of the positive wire 37 has been detached from the positive terminal 32*p*, the subassembly K including the battery 32, the battery tray 61, and the ground wire 38 can be taken out of the battery holding rack 41 through the left opening 34*a* thereof. Conversely, for storing the subassembly K into the battery holding rack 41, when the subassembly K is inserted into the battery holding rack 41 through the left opening 34*a* thereof, the battery tray 61 is temporarily stopped in the maintenance position, and the first terminal 37*a* of the positive wire 37 is connected to the positive terminal 32*p* and they are covered with the insulative cover CV. At this time, the second terminal 38*b* of the ground wire 38 is spaced from the crankcase 20 (grounding member) to which the second terminal 38*b* is to be fastened. Therefore, the ground wire 38 is prevented from being connected before the positive wire 37 is connected.

After the connection of the positive wire 37 to the positive terminal 32*p* has been completed, the subassembly K is further inserted into the battery holding rack 41 until the battery tray 61 reaches the storage position. At this time, the fastening portion 38*b*4 of the second terminal 38*b* nearly abuts against the fastening member on the engine hanger 36 of the crankcase 20. The fastening bolt Bg is inserted into the fastening portion 38*b*4 of the second terminal 38*b* from outside along the widthwise directions of the motorcycle, and threaded and tightened into the fastening member on the engine hanger 36, fixing the second terminal 38*b* to the crankcase 20 thereby to make the grounding connection. The connection of the positive wire 37 and the ground wire 38 to the battery 32 is now completed, after which the lid 47 that has been open is closed completing the installation of the battery 32 on the vehicle frame.

As described above, the battery holding structure for the vehicle according to the above embodiment includes the battery tray 61 for storing the battery 32 therein, the battery holding rack 41 fixed to the vehicle frame, for storing the battery tray 61 with the battery 32 stored therein and allowing the battery tray 61 to be pulled out to one side along the widthwise directions of the motorcycle, the ground wire 38 having one end connected to the negative terminal 32*m* of the battery 32 and another end connected to a grounding member (crankcase 20) on the vehicle frame, and the movement prevention member (wire clamp 65) for fixing the other end of the ground wire 38 to the battery tray 61 and preventing the battery tray 61 from being pulled out to one side along the widthwise directions of the motorcycle with the ground wire 38 connected to the grounding member.

With this arrangement, the battery tray 61 is prevented from being pulled out with the ground wire 38 connected to the grounding member. When the battery 32 is to be maintained, the ground wire 38 may be disconnected from the grounding member to allow the battery tray 61 to be pulled out into the maintenance position. Therefore, the battery 32 is prevented from moving out of the storage position, and no process is required to remove a battery band or the like that holds the battery 32 against movement, separately from the ground wire 38, with the result that the process of maintaining the battery 32 is facilitated.

The above battery holding structure for the vehicle has the connection and disconnection prevention member (rack top wall 45 and rack upper rear wall 46) which prevents the positive wire 37 from being connected to and disconnected from the positive terminal 32*p* of the battery 32 when the battery tray 61 with the battery 32 stored therein is in the storage position within the battery holding rack 41, and which allows the positive wire 37 to be connected to and disconnected from the positive terminal 32*p* when the battery tray 61 is in the maintenance position where it has been pulled out of the storage position by a predetermined distance.

With this arrangement, after the ground wire 38 has been disconnected from the grounding member and the battery tray 61 has been pulled out a predetermined distance, the positive wire 37 can be connected to and disconnected from the positive terminal 32*p*. Therefore, the worker is guided to perform a proper working procedure.

The above battery holding structure for the vehicle has the second terminal 38*b* for fastening the ground wire 38 and the grounding member to each other. The second terminal 38*b* is fastened to the grounding member by a fastening operation from one side along the widthwise directions of the motorcycle.

With this arrangement, it is possible to pull out the battery tray 61 as well as to attach and detach the second terminal 38*b* from one side along the widthwise directions of the motorcycle, improving the maintenance operation of the battery 32.

In the above battery holding structure for the vehicle, the positive terminal 32*p* is disposed on one side of the battery 32 along the widthwise directions of the motorcycle, whereas the negative terminal 32*m* is disposed on the other side of the battery 32 along the widthwise directions of the motorcycle.

With this arrangement, the positive terminal 32*p* can be exposed to allow the positive wire 37 to be connected and disconnected when the battery tray 61 is pulled out by a small distance. The positive wire 37 can be connected and disconnected while much of the battery tray 61 is being stored and held stably in the battery holding tray 41. Since the periphery of the positive terminal 32*p* can easily be exposed out of the battery holding rack 41, the space in which to perform a process of connecting and disconnecting the positive wire 37 is increased for a better maintenance operation.

In the above battery holding structure for the vehicle, the battery tray 61 includes the handle 68 for pulling out itself on one side thereof along the widthwise directions of the motorcycle.

With this arrangement, the operation to pull out the battery tray 61 is made efficient.

The above battery holding structure for the vehicle includes the pullout prevention member (first and second recesses 71 and 72 and first and second engaging teeth 51 and 52) for preventing the battery tray 61 from being pulled out along the widthwise directions of the motorcycle. The pullout prevention member has the first engaging portion (first and second recesses 71 and 72) disposed on the battery tray 61 and the second engaging portion (first and second engaging teeth 51 and 52) disposed on the battery holding rack 41, for engaging the first engaging portion in each of the storage position and the maintenance position.

With this arrangement, inasmuch as the battery tray 61 is kept in the storage position and the maintenance position, the operation to maintain the battery tray 61 is made efficient, and the battery tray 61 is prevented from being dislodged unintentionally.

As shown in FIG. 13, according to the above embodiment, the fastening portion 38*b*4 of the second terminal 38*b* is disposed more outwardly along the widthwise directions of the motorcycle (along the direction in which to pull out the battery tray 61) than the outer end along the widthwise directions of the motorcycle of the wire clamp 65 which secures a portion of the ground wire 38 near its other end to the battery tray 61, by a predetermined distance b1. Therefore, the portion of the ground wire 38 that extends from the outer end along the widthwise directions of the motorcycle of the wire clamp 65 to the second terminal 38b is relatively long, so that the ground wire 38 flexes to a large extent when the battery tray 61 is prevented from being pulled out, making it difficult to prevent the battery tray 61 from being pulled out with moderation.

Figure 14:
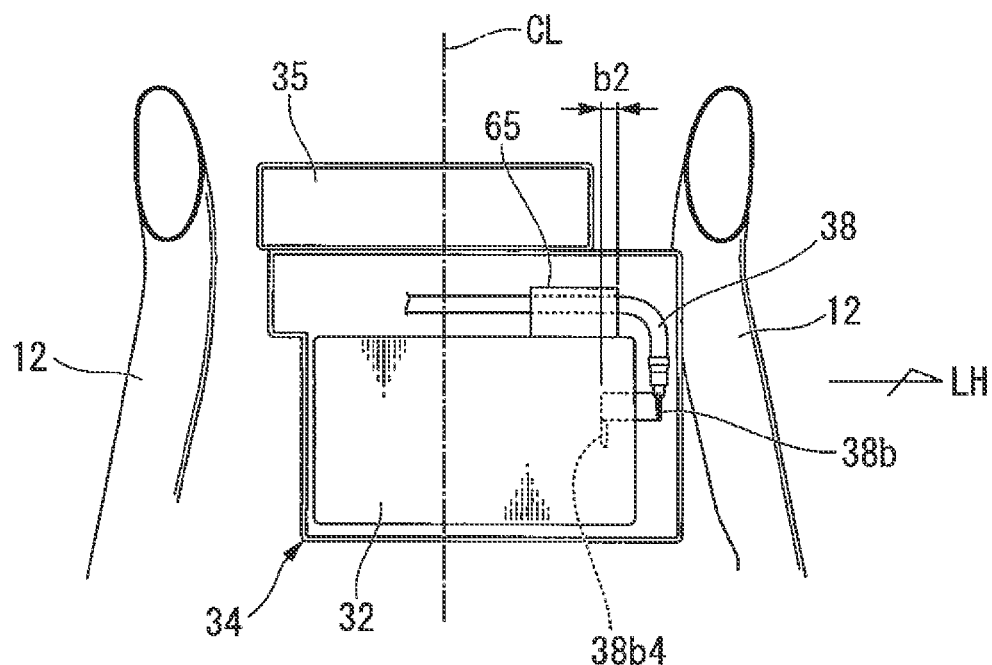
FIG. 14 is a cross-sectional view corresponding to FIG. 13, showing a modification of the embodiment.

According to a modification shown in FIG. 14, the outer end along the widthwise directions of the motorcycle of the wire clamp 65 is disposed more outwardly along the widthwise directions of the motorcycle (along the direction in which to pull out the battery tray 61) than the fastening portion 38b4 of the second terminal 38b, by a predetermined distance b2. Therefore, the portion of the ground wire 38 that extends from the outer end along the widthwise directions of the motorcycle of the wire clamp 65 to the second terminal 38b is relatively short, so that the ground wire 38 flexes to a small extent when the battery tray 61 is prevented from being pulled out, making it possible to prevent the battery tray 61 from being pulled out with increased moderation. If an arrangement is incorporated to apply tension to the ground wire 38 when the battery tray 61 is prevented from being pulled out, then the battery tray 61 is better prevented from being pulled out.

The present invention is not limited to the above embodiment, but may be applied to, for example, not only motorcycles (including bicycles with a prime mover and scooter-type vehicles), but also three-wheeled vehicles (including vehicles with one front wheel and two rear wheels and vehicles with two front wheels and one rear wheel) or four-wheeled vehicles.

The arrangement according to the above embodiment represents an example of the present invention, and various changes, such as known components replacing components according to the embodiment, can be made without departing from the scope of the present invention.

DESCRIPTION OF REFERENCE SYMBOLS

1: Motorcycle (vehicle)
20: Crankcase (grounding member)
32: Battery
32p: Positive terminal
32m: Negative terminal
37: Positive wire
38: Ground wire
38b: Second terminal (grounding member fastening member)
41: Battery holding rack (battery holding member)
45: Rack top wall (connection and disconnection prevention member)
46: Rack upper rear wall (connection and disconnection prevention member)
51: First engaging tooth (pullout prevention member, second engaging portion)
52: Second engaging tooth (pullout prevention member, second engaging portion)
61: Battery tray
65: Wire clamp (movement prevention member)
68: Handle
71: First recess (pullout prevention member, first engaging portion)
72: Second recess (pullout prevention member, first engaging portion)

The invention claimed is:

1. A battery holding structure for a vehicle, said structure comprising:
   a battery tray configured to store a battery therein;
   a battery holding rack fixed to a vehicle frame, configured to store said battery tray with said battery stored therein and to allow said battery tray to be pulled out along widthwise directions of the vehicle;
   a ground wire having one end connected to a negative terminal of said battery and another end connected to a grounding member on the vehicle frame; and
   a movement prevention member configured to fix said ground wire at a location on a rear side of said battery tray, between the one end of the ground wire, located at a second side along the widthwise direction of the vehicle, and the another end of the ground wire, located at the rear side of said battery tray, and to prevent said battery tray from being pulled out to a first side along the widthwise direction of the vehicle, wherein said ground wire is connected to said grounding member at the first side along the widthwise direction of the vehicle.

2. The battery holding structure for a vehicle according to claim 1, further comprising:
   a connection and disconnection prevention member configured to prevent a positive wire from being connected to and disconnected from a positive terminal of said battery when said battery tray with said battery stored therein is in a storage position within said battery holding rack, and to allow said positive wire to be connected to and disconnected from said positive terminal when said battery tray is in a maintenance position where said battery tray has been pulled out of said storage position by a predetermined distance.

3. The battery holding structure for a vehicle according to claim 1, further comprising:
   a grounding member fastening member configured to fasten said ground wire and said grounding member to each other;
   wherein said grounding member fastening member is configured to be fastened to said grounding member by a fastening operation from first side along the widthwise directions of the vehicle.

4. The battery holding structure for a vehicle according to claim 1, wherein a positive terminal of said battery is disposed on the first side of said battery along the widthwise directions of the vehicle, and wherein the negative terminal of said battery is disposed on the second side of said battery along the widthwise directions of the vehicle.

5. The battery holding structure for a vehicle according to claim 1, wherein said battery tray includes a handle on the first side thereof along the widthwise directions of the vehicle.

6. The battery holding structure for a vehicle according to claim 1, further comprising:
   a pullout prevention member configured to prevent said battery tray from being pulled out along the widthwise directions of the vehicle,
   wherein said pullout prevention member has a first engaging portion disposed on said battery tray and a second engaging portion disposed on said battery holding rack, said second engaging portion being configured to engage the first engaging portion in each of a storage position of said battery tray and a maintenance position of said battery tray.

7. The battery holding structure for a vehicle according to claim 1, further comprising:
   a grounding member fastening member configured to fasten said ground wire and said grounding member to each other,
   wherein said movement prevention member is disposed more towards the second side of the battery tray along the widthwise directions of the vehicle than said grounding member fastening member.

8. A battery holding structure for a vehicle, said structure comprising:
   battery tray means for supporting a battery therein;
   battery holding rack means for storing said battery tray means and the battery, said battery holding rack means being fixed to a vehicle frame and also being for allowing said battery tray means to be pulled out along widthwise directions of a vehicle;
   ground wire means for grounding the battery, said ground wire means having one end thereof connected to a negative terminal of the battery and another end connected to a grounding member means on the vehicle frame; and
   movement prevention means for fixing said ground wire means at a location on a rear side of said battery tray, between the one end of the ground wire, located at a second side along the widthwise direction of the vehicle, and the another end of the ground wire, located at the rear side of said battery tray means, and for preventing said battery tray means from being pulled out to a first side along the widthwise direction of the vehicle, wherein said ground wire means are connected to said grounding member means at the first side along the widthwise direction of the vehicle.

9. The battery holding structure according to claim 8, further comprising:
   connection and disconnection prevention means for preventing a positive wire means from being connected to and disconnected from a positive terminal of the battery when said battery tray means and the battery is in a storage position within said battery holding rack means, and for allowing the positive wire means to be connected to and disconnected from the positive terminal when the battery tray means is in a maintenance position where the battery tray means has been pulled out of the storage position by a predetermined distance.

10. The battery holding structure for a vehicle according to claim 8, further comprising:
    grounding member fastening means for fastening the ground wire means and the grounding member means to each other;
    wherein said grounding member fastening means is configured to be fastened to said grounding member means by a fastening operation from the first side along the widthwise directions of the vehicle.

11. The battery holding structure for a vehicle according to claim 8, wherein a positive terminal of the battery is disposed on the first side of the battery along the widthwise directions of the vehicle, and wherein the negative terminal of the battery is disposed on the second side of the battery along the widthwise directions of the vehicle.

12. The battery holding structure for a vehicle according to claim 8, wherein the battery tray means includes a handle on the first side thereof along the widthwise directions of the vehicle.

13. The battery holding structure for a vehicle according to claim 8, further comprising:
    pullout prevention means for preventing said battery tray means from being pulled out along the widthwise directions of the vehicle,
    wherein the pullout prevention means includes first engaging means disposed on the battery tray means and second engaging means disposed on the battery holding rack means, said second engaging means for engaging the first engaging means in each of a storage position of the battery tray means and a maintenance position of the battery tray means.

14. The battery holding structure for a vehicle according to claim 8, further comprising:
    grounding member fastening means for fastening the ground wire means and the grounding member means to each other,
    wherein the movement prevention means is disposed more towards another side of the battery tray along the vehicle widthwise directions of the vehicle then the grounding member fastening means.

* * * * *